US007987119B2

(12) United States Patent
Minnocci

(10) Patent No.: US 7,987,119 B2
(45) Date of Patent: Jul. 26, 2011

(54) INVENTORY MANAGEMENT FOR POSTAGE SUPPLIES

(75) Inventor: Lodovico Minnocci, Hamden, CT (US)

(73) Assignee: Neopost Technologies, Bagneux (FR)

( * ) Notice: Subject to any disclaimer, the term of this patent is extended or adjusted under 35 U.S.C. 154(b) by 1967 days.

(21) Appl. No.: 10/768,871

(22) Filed: Jan. 30, 2004

(65) Prior Publication Data

US 2005/0171869 A1    Aug. 4, 2005

(51) Int. Cl.
*G06Q 10/00* (2006.01)
(52) U.S. Cl. ............................. 705/28; 705/60; 705/404
(58) Field of Classification Search .................... 705/28, 705/401, 400, 402, 404, 60, 410; 235/375, 235/376; 209/3.3, 583, 584, 509, 552, 576, 209/577; 377/1, 6, 13, 14, 15, 16; 700/90, 700/213, 214, 215, 219; 707/104.1; 60/28, 60/60, 404, 410
See application file for complete search history.

(56) References Cited

U.S. PATENT DOCUMENTS

| | | | | |
|---|---|---|---|---|
| 5,077,694 A | * | 12/1991 | Sansone et al. | 707/104.1 |
| 5,257,196 A | * | 10/1993 | Sansone | 705/403 |
| 5,305,199 A | * | 4/1994 | LoBiondo et al. | 705/28 |
| 5,337,246 A | * | 8/1994 | Carroll et al. | 705/402 |
| 5,383,115 A | * | 1/1995 | Lecarpentier | 705/401 |
| 5,640,835 A | * | 6/1997 | Muscoplat | 53/569 |
| 5,666,421 A | * | 9/1997 | Pastor et al. | 380/51 |
| 5,673,193 A | * | 9/1997 | Brust et al. | 705/406 |
| 5,778,377 A | * | 7/1998 | Marlin et al. | 707/103 R |
| 5,826,247 A | * | 10/1998 | Pintsov et al. | 705/404 |
| 6,101,487 A | * | 8/2000 | Yeung | 705/410 |
| 6,297,821 B1 | * | 10/2001 | Baker et al. | 715/744 |
| 6,298,337 B1 | * | 10/2001 | Kubatzki et al. | 705/410 |
| 6,317,498 B1 | * | 11/2001 | Pastor et al. | 380/51 |
| 6,678,360 B1 | * | 1/2004 | Katz | 379/88.2 |
| 6,820,065 B1 | * | 11/2004 | Naclerio | 705/401 |
| 6,833,787 B1 | * | 12/2004 | Levi | 340/539.13 |
| 7,035,832 B1 | * | 4/2006 | Kara | 705/408 |
| 7,047,221 B1 | * | 5/2006 | Hetzer et al. | 705/50 |
| 7,058,614 B1 | * | 6/2006 | Wesseling et al. | 705/408 |
| 7,216,086 B1 | * | 5/2007 | Grosvenor et al. | 705/7 |
| 2003/0037007 A1 | * | 2/2003 | Beckstrom et al. | 705/60 |
| 2003/0225711 A1 | * | 12/2003 | Paping | 705/404 |

* cited by examiner

*Primary Examiner* — Matthew S Gart
*Assistant Examiner* — Talia Crawley
(74) *Attorney, Agent, or Firm* — Morris & Kamlay LLP

(57) ABSTRACT

A mailpiece inventory management system. The system includes a franking machine, a mailpiece identification system coupled to the franking machine and a administration system adapted to communicate with the franking machine. There can be at least one mailpiece counter in the franking machine with each mailpiece counter associated with a type of mailpiece and incremented when a particular type of mailpiece as identified by the mailpiece identification system is franked by the franking machine.

16 Claims, 4 Drawing Sheets

| Envelope Options | | INVENTORS LEVEL (STOCKED) | # FRANKED | PREDETERMINED LEVEL |
|---|---|---|---|---|
| Envelope Options | Printing Options | | | |
| Envelope Size: | | | | |
| Size 10 | (4 1/8 X 9 1/2 in) | | | |
| Size 10 | (4 1/8 X 9 1/2 in) | | | |
| Size 6 3/4 | (3 5/8 X 6 1/2 in) | | | |
| Monarch | (3 7/8 X 7 1/2 in) | | | |
| Size 9 | (3 7/8 X 8 7/8 in) | | | |
| Size 11 | (4 1/2 X 10 3/8 in) | | | |
| Size 12 | (4 3/4 X 11 in) | | | |
| C1 | (110 X 200 mm) | | | |
| C4 | (229 X 324 mm) | | | |
| C5 | (162 X 229 mm) | | | |
| C6 | (114 X 162 mm) | | | |
| C65 | (114 X 229 mm) | | | |
| Custom Size | | | | |
| From 229 | Auto ▶ | | | |

FIG.2

INVENTORY MANAGEMENT FOR POSTAGE SUPPLIES

BACKGROUND OF THE INVENTION

1. Field of the Invention

The present invention generally relates to inventory management, and in particular to using a franking machine to manage mail system supply usage inventory.

2. Brief Description of Related Developments

Postage meters, also referred to as franking machines, are generally known in the art. Generally, a franking machine is used to print postal indicia on an envelope or label. As the postage meter dispenses funds to print the indicia, accounting records are kept in the postage meter to monitor usage of the postal meter. For example a funds account in the meter can represent the funds available in the meter. As postal indicia is printed, these funds are depleted accordingly. Generally, the accounting data related to the funds available for printing postage, or the funds expended, are contained in registers in the postage meter. The funds are accessed and registers adjusted and updated for every meter trip. A "trip" can be defined as the act of printing or dispensing a postal indicia. The register and meter trips date, also referred to as cycles, can be electronically transmitted to a central station for accounting and other administrative processes.

Mail handling systems for printing postal indicia on mail items are known. Franking machines can include a printing device for printing a franking impression including postal indicia on a mail piece as well as accounting and control unit functions.

Postage meters are generally stand-alone devices that print postage indicia on mail items such as for example envelopes or labels. The meters are typically at a single user location and provide metering for that location. Postage meters and franking machines can include control panels and displays that allow a user to access the functions of each device and the system.

A postage metering system can also include other functionalities for the processing of mail items, including inbound, outbound mail, parcel and information flow.

A secure cryptographic vault device, also known as a postal security device (PSD), is used for securely storing data, such as amounts of postage. The cryptographic vault device can securely store data so that the data cannot be tampered with without destroying the data. The data stored in a cryptographic vault is secured against physical attacks on the hardware of the cryptographic vault device and against software intrusions.

The cryptographic vault device is integrated in turnkey postage dispensing systems, such as postage meters. Other devices integrated with the cryptographic vault device can include, for example, a printer, a scale, and an envelope feeder mechanism. The turnkey system can also include a personal computer, server or workstation directly coupled to the cryptographic vault device. Direct access to the cryptographic vault device is only from some of the integrated components of the postage dispensing system. Therefore, the use of the cryptographic vault device is limited to the functions built into the integrated postage dispensing system. In order to provide customized access to the cryptographic vault device, a user would have to acquire a turnkey system, which includes predefined devices and software, and then customize the turnkey system to meet business requirements.

Value metering devices are devices which in their most basic form meter value. These devices take various forms such as, for example, postage meters (i.e. franking machines), various kinds of vending machines (i.e. lottery vending machines), tax stamp machines, various kinds of ticket dispensing machines, etc. Of these various devices, postage meters are one form of a value metering device that dispense value in the form of postage, e.g. postage indicia, basically either as a stand-alone type postage meter or as part of a mailing system. The stand-alone type postage meter is basically a postage meter having both its entire accounting system and security system positioned in a single secure housing, the accounting system being mechanically coupled to the printing mechanism which prints the postage related indicia.

In addition to the stand-alone type systems as described above there are mailing systems which are basically formed of a mailing machine (i.e. a machine that can perform different mailing related functions (e.g. feeding, stacking, separating, sealing of envelopes, etc.) on which a postage meter is securely mounted. The postage meter is typically located in a securely sealed housing, which contains the accounting and printing mechanisms. In the past few years both ink jet printing technology and smart card technology (i.e. smart cards used for securely housing the accounting circuitry of the postage meter) have been employed in these postage meters. The mailing machine systems including an electronic postage meter have enabled the users of such equipment to customize the exact type of mailing system they require by designing the overall mailing system in a modular fashion. One is able to set up a mailing system that will include individually removably mounted modules that can be added to or removed from the mailing system. For example, if one had a modular mailing system without an envelope stacker, one could add such a module to their system, and thereby have a mailing system that is able to stack envelopes once the postage has been placed on envelopes that are fed into the system. If the stacker module required repair, the stacker could easily be removed for repair since it is but one module within a modular system. Features such as inserters, feeders/separators, sealers, scales, moisteners, addressers, stackers, etc. can be added for use with a postage meter to form different types of mailing systems.

Typically, the postage can be printed directly on a mailpiece, or a label that is to be attached to the mailpiece.

A mailpiece can include envelopes, packages, and in some instances boxes. Envelopes come in a variety of shapes and sizes, and in some applications, the postage can be printed directly on the envelope. Otherwise, labels suitable for United States Postal Service ("USPS") applications, can be used.

In any mail processing system, the volume of usage of different types of mailpieces can vary. The franking machine maintains, among other things, data and records regarding the number of cycles of the franking machine and the amount of funds used for franking and the amount of funds available. It would be helpful to be able to automatically track the usage of supplies, and in particular envelopes and labels, related to the mail system process based on the number of cycles of the franking machine.

SUMMARY OF THE INVENTION

The present invention is directed to a mailpiece inventory management system. In one embodiment the system comprises a franking machine, a mailpiece identification system coupled to the franking machine and a administration system adapted to communicate with the franking machine. At least one mailpiece counter or register is included in the franking machine. Each mailpiece counter or register can be associated with a specific type of mailpiece. The counter or register is incremented when a particular type of mailpiece, as identified by the mailpiece identification system, is franked by the franking machine.

In another aspect, the present invention is directed to a method of maintaining mailpiece inventory in a franking system. In one embodiment the method comprises determining a type of mailpiece to be franked. When the type of mailpiece is franked a counter in the franking machine associated with the type of mailpiece is changed or incremented to reflect the franking of the type of mailpiece. The number of the type of mailpiece franked is compared with a predetermined inventory level for the type of mailpiece to determine if more inventory of the type of mailpiece is needed.

In a further aspect, the present invention is directed to a computer program product. In one embodiment the computer program product comprises a computer useable medium having computer readable code means embodied therein for causing a computer to manage mailpiece inventory in a mail processing system. The computer readable code means in the computer program product comprises computer readable program code means for causing a computer to determine a type of mailpiece to be franked by a franking machine, change a counter in the franking machine corresponding to the type of mailpiece when the mailpiece is franked, compare a reading of the counter with a predetermined inventory level stored in a database, and adjust a level of mailpiece inventory at a users site in order to restore the mailpiece inventory to a predetermined level.

BRIEF DESCRIPTION OF THE DRAWINGS

The foregoing aspects and other features of the present invention are explained in the following description, taken in connection with the accompanying drawings, wherein:

FIG. 2 is an illustration of an inventory table for mailpieces that can be used with the present invention.

DETAILED DESCRIPTION OF THE PREFERRED EMBODIMENT(S)

Figure 1:
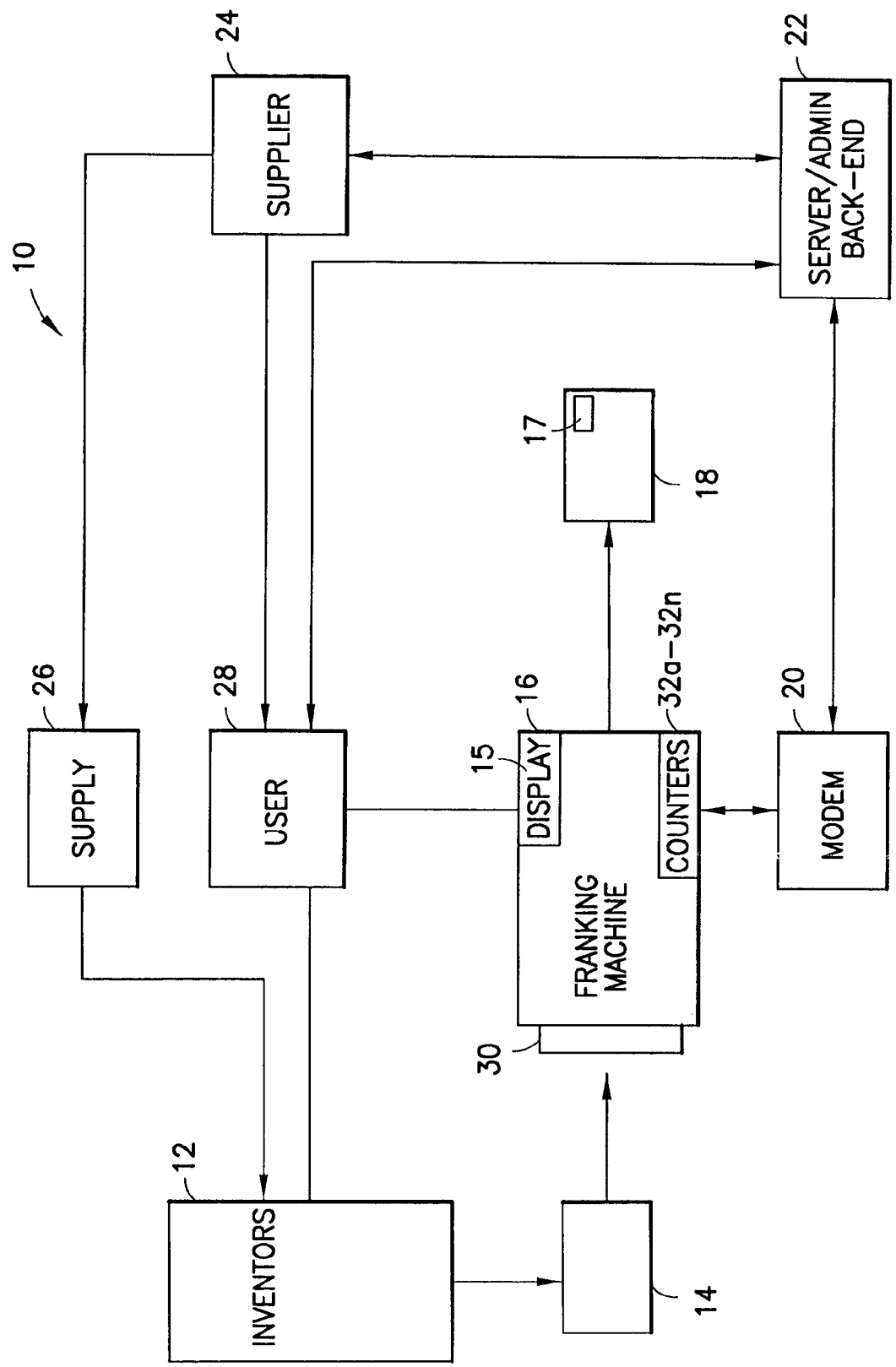
FIG. 1 is a schematic diagram of a system incorporating features of the present invention.

Referring to FIG. 1, a schematic diagram of a system 10 incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

As shown in FIG. 1, a franking machine 16 is set up to print postage indicia 17 as required on mailpiece 18. Although the illustration of the mailpiece 18 is in the form of an envelope, as noted earlier, envelopes come in a variety of shapes and sizes, and the indicia 17 can also be reproduced on a label. The franking machine 16 or postage meter can be part of a mail system 40, such as for example a mailroom or mail processing center. In the embodiment shown in FIG. 1, the franking machine 16 can be connected to for example, a modem 20, that allows the franking machine 16 to communicate with a server 22 or administration system, also referred to a back-end server. The server/back-end system 22 could comprise a postal system administrator, vendor or servicing center, such as for example, NEOPOST™. The modem 20 can comprise any suitable data communication interface that allows a user to connect to and communicate with, including the transfer of data, the server system 22. The modem 20 can include for example, a dial-up modem, a network connection, and a wireless or optical means of communication. In one embodiment the franking machine 16 could be coupled directly, via a hardwire, or wireless connection, to the Internet (WWW).

Generally, a user 28 will keep a supply 12 of envelopes or labels 14 on hand. Any suitable arrangement for maintaining the inventory 12 can be used. As envelopes or labels are needed for printing postage indicia, the inventory 12 is depleted. In order to avoid running out of inventory supply 12, a minimum amount might be kept on hand while a new supply 26 is on order. Alternatively, when the inventory 12 reaches a predetermined level, a new supply 26 would need to be ordered to ensure that the inventory 12 does not run out or that an adequate supply is maintained. In order to monitor and maintain the inventory supply 12, the user needs to track the usage of envelopes 14 versus the inventory 12 on hand. The present invention will automatically track envelope usage based on franking activities.

The disclosed embodiments track, via the franking machine 16, the types and quantities of envelopes 14 being frank (i.e. used). When a user 28 places an envelope 14 into the franking machine 16 for franking, the type of envelope 14 is identified. The type could include for example, a size, color, a brand, or other type or product information. The type could be identified by a name, a product code, a SKU number or any other suitable identifier. When franking occurs, a counter or tracking system 32 in or coupled to the franking machine 16 is tripped. Each envelope or label 14 type could have a separate counter associated with it. When data from the franking machine, 16 is downloaded to the server/back-end 22, the envelope inventory 12 usage is transferred from the counter system 32 as well. If the number of envelopes 14 franked of a certain type exceeds a predetermined minimum, the sever/back-end 22 can automatically notify the user that the inventory is below a predetermined value, and/or arrange to order or deliver more inventory.

Generally, every time the franking machine 16 cycles, an envelope 14 or label, or other suitable medium onto which a postage indicia can be printed, is run through the franking machine 16 and franked. This produces a franked or utilized envelope 18. As envelopes 14 are franked, the inventory 12 of the envelope 14 is depleted. Periodically, the franking machine 16 transmits statistical data related to the franking machine 16 to a backend server or host administrator 22. This statistical data can include for example, accounting data, use data or other information needed for the operation and usage of the franking machine 16. The server 22 maintains administrative controls via this data and information.

The medium identifier 30 shown in FIG. 1 is used to determine and identify the type of medium 14 that is being franked. For example, the medium identifier 30 can determine if the medium 14 is an envelope or a label. The medium identifier 30 can also determine a size of the medium 14. In one embodiment, the user can select and input the type of medium 14 that is to be imprinted directly into the medium identifier 30 via a user interface or graphical use interface on the franking machine 16. The medium identifier 30 could be a manual or automated system. For example, the user 28 could input an entry into the franking machine 16 to identify the particular type of envelope 14. Each envelope 14 could have a unique code associated with it that identifies it. This could include a product code or SKU. Alternatively, a text identifier could also be used.

Figure 3:
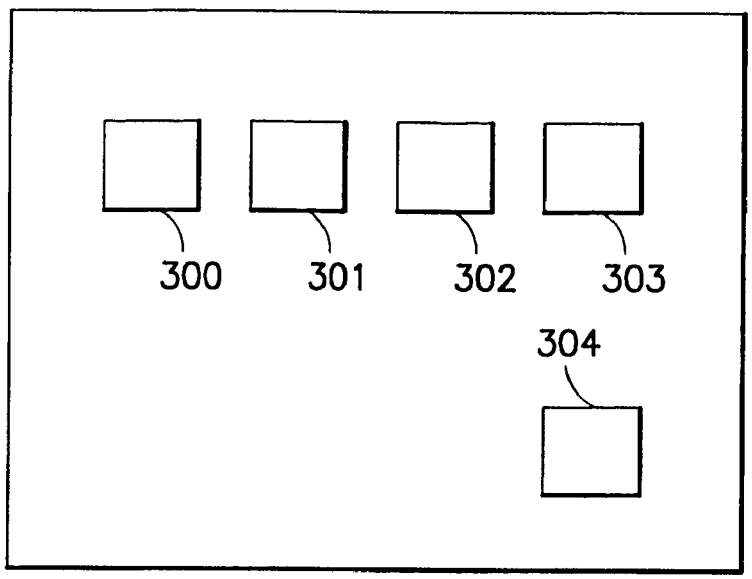
FIG. 3 is an illustration of a graphic user interface menu for a system incorporating features of the present invention.

The franking machine 16 could include a graphical user interface (GUI) that allows menu selection for the type of envelope, as shown for example in FIG. 3. For example, referring to FIG. 3, the franking machine 16 could include a selection buttons 300-304 for inputting the type of envelope, although more or less buttons could be used depending on the extent of the inventory. The buttons 300-304 could be fixed buttons or soft buttons. The soft buttons could also be layer to provide more options with respect to any one type or size of envelope, including color, texture or thickness. In another embodiment, the user 28 could either enter an associated code via a keypad, or pick a selection from a menu on the franking machine.

Figure 4:
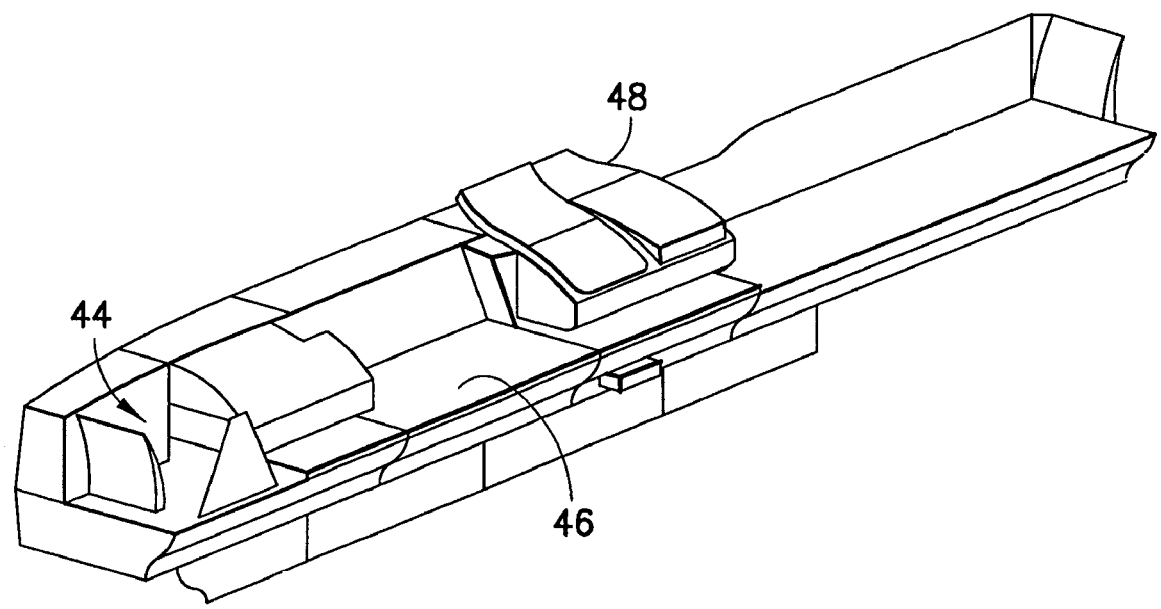
FIG. 4 is block diagram of one embodiment of a system incorporating features of the present invention.

In one embodiment the franking machine 16 of FIG. 1 could require that the user 28 identify the type of envelope 14 that will be franked prior to enabling the franking machine to print on or frank the envelope. In one embodiment, referring to FIG. 4, the franking machine 48 can include a scanning device 46 that is adapted to automatically detect the type of envelope 44 that is about to be franked. The scanning device 46 could be a barcode scanner that detects a code 42 on the envelope 44, which identifies the type of envelope 44. The code 42 could comprise, for example, a one or two dimensional bar code, although in alternate embodiments any suitable type of code or identifier can be used. In another embodiment the scanning device 46 can be adapted to automatically determine a size of the envelope 44, such as for example a length and/or width, which typifies the particular type or style of envelope. Although the term scanner and scanning device is used here, it will be understood that any suitable device or system can be used that can identify a type of envelope or label being used.

Once the type of medium 14 and the size is determined, that information can be compared to a database of the different types of mediums that are available and stored in the inventory 12. If a match occurs, that data can be stored in the counter 32 of FIG. 1 in the franking machine 16 or a storage unit or counter coupled to franking machine 16. Periodically, when the franking machine 16 communicates with the server 22, the data related to the usage of the inventory 12 is transmitted to the server. Within the server 22, the usage information can be compared to pre-established standards or levels for inventory. The standards can define how much inventory of each particular postage printing medium the user 28 intends to keep on hand in inventory 12. The desired inventory levels for each type of franking medium used in the user's system 10 can be preset by the user. For example, the user 28 can submit inventory requirements to the server/back-end system 22 for each type of franking medium 14 that is used in the system 10. These inventory requirements are stored and then used to determine replenishment needs in view of usage.

In one embodiment, if a certain amount of usage is detected, and the desired quantity or minimum level of inventory 12 is reached, the server 22 can generate a notification to the server 28 that the inventory level is low and new supplies need to be ordered. For example, the server 22 could generate an automatic notification, such as for example, an electronic mail communication, that is transmitted to the user 25 to notify the user of the inventory level of a particular franking medium 14. In another embodiment, the server 22 could generate a notification that is returned to the franking machine 16 that causes the franking machine 16 to display a suitable warning or notification. For example, the display 15 of the franking machine 16 could display a message that replenishment of a franking medium type is needed or that levels are low. The menu or display (GUI) 15 of the franking machine 16 could include an acknowledgement button that can allow the user 28 to cancel the notification, clear the display 15, or even generate a return signal that inventory levels have been replenished or restored and are at a desired level. In one embodiment, the user 28 can activate a menu function on the display 15 that allows the user 28 to automatically order more inventory from the supplier 24. Alternatively, when the inventory levels drop below the predetermined level, the server 22 could automatically notify a supplier 24 of the need for a particular stock of inventory, and an order for more inventory automatically placed. The new supply 26 is delivered to the user 28 to restore inventory 12 to the desired levels. When delivered, the server 22 can be notified and the last known depletion levels can be adjusted to the new inventory level. For example, the user 28 could activate an "Inventory Restored" function on the menu or display 15. This activation could also include the user 28 inputting the current inventory level for the particular type of the franking medium 14. That data or information could be automatically transmitted during communication between the franking machine 16 and the server/back-end system 22, or in any suitable manner. In one embodiment, the supplier could notify the server of the delivery. In another, the franking machine 16 or medium identifier 30 could include an inventory set control the resets the particular counter to reflect the new inventory level. In a further embodiment, the inventory system 12 could include an inventory level check or monitor that determines the level of each particular item in the inventory 12 and transmits an indicator message when the level is full or empty to the franking machine 16 and medium identifier 30.

The disclosed embodiments use the franking machine 16 in a mail processing system 10 to track and monitor franking medium 14 usage. As the franking machine 16 is ready to frank a mailpiece 14, such as for example, an envelope or label, the type of mailpiece 14 is identified to the franking machine 16, either manually or automatically. When the franking machine 16 franks the mailpiece 14, a counter, from one or more counters 32a-32n, associated with the particular mailpiece 14 records the usage of the mailpiece 14, as identified by type. When the franking machine 16 transmits accounting, statistical and other information to the server/back-end system 22. The data from counters 32a-32n is transmitted as well. The mailpiece usage as recorded in the counters 32a-32n is compared to predetermined inventory levels. If the inventory 12 needs to be restocked, new supplies can be ordered, either via the user 28 or through the server/back-end 22. The counters 32a-32n can be reset once the inventory 12 is restored.

Figure 5:
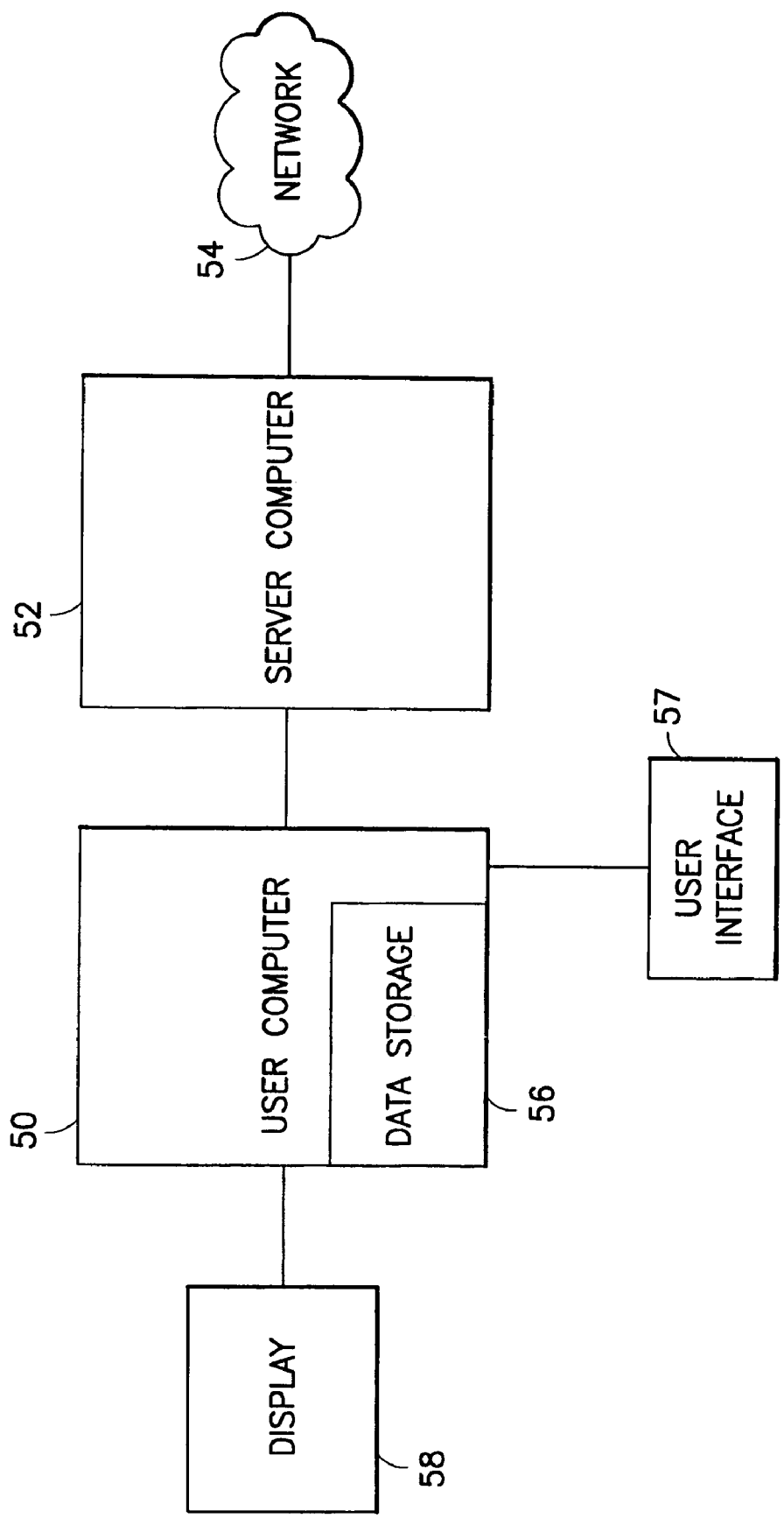
FIG. 5 is one embodiment of an architecture that can be used to practice the present invention.

The present invention may also include software and computer programs incorporating the process steps and instructions described above that are executed in different computers. In the preferred embodiment, the computers are connected to the Internet. FIG. 5 is a block diagram of one embodiment of a typical apparatus incorporating features of the present invention that may be used to practice the present invention. As shown, a computer system 50 may be linked to another computer system 52, such that the computers 50 and 52 are capable of sending information to each other and receiving information from each other. In one embodiment, computer system 52 could include a server computer adapted to communicate with a network 54, such as for example, the Internet. Computer systems 50 and 52 can be linked together in any conventional manner including a modem, hard wire connection, or fiber optic link. Generally, information can be made available to both computer systems 50 and 52 using a communication protocol typically sent over a communication channel or through a dial-up connection on ISDN line. Computers 50 and 52 are generally adapted to utilize program storage devices embodying machine readable program source code which is adapted to cause the computers 50 and 52 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 50 and 52 may also include a microprocessor for executing stored programs. Computer 50 may include a data storage device 56 on its program storage device for the storage of information and data. The computer program or software incorporating the processes and method steps incorporating features of the present invention may be stored in one or more computers 50 and 52 on an otherwise conventional program storage device. In one embodiment, computers 50 and 52 may include a user interface 57, and a display interface 58 from which features of the present invention can be accessed. The user interface 57 and the display interface 58 can be adapted to allow the input of queries and commands to the system, as well as present the results of the commands and queries.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A mailpiece inventory management system comprising:
   a franking machine;
   a database of mailpiece types;
   a mailpiece identification system coupled to the franking machine, said mailpiece identification system comprising a scanner adapted to identify the type of each mailpiece franked by the franking machine from among a plurality of mailpiece types defined by the database of mailpiece types;
   a plurality of mailpiece counters in the franking machine, each mailpiece counter associated with a type of mailpiece and incremented when a particular type of mailpiece as identified by the mailpiece identification system is franked by the franking machine; and
   a notification system adapted to notify a user of the system when a level of a first type of mailpiece inventory is below a predetermined level, based upon a comparison of one of the plurality of mailpiece counters to the predetermined level for the first type of mailpiece stored in the administration system,
   said one of the plurality of mailpiece counters being assigned to the first type of mailpiece and incremented when the first type of mailpiece as identified by the mailpiece identification system is franked by the franking machine.

2. The system of claim 1 wherein the scanner comprises a bar-code scanner and each mailpiece in an inventory of mailpiece includes a bar-code identifying a type of the mailpiece.

3. The system of claim 1 wherein the scanner is an optical scanner adapted to identify a particular type of mailpiece based on at least one dimension of the mailpiece.

4. The system of claim 1 wherein the mail identification system comprises a menu display on the franking machine that allows a user to input a type of mailpiece being franked into the franking machine.

5. The system of claim 1 wherein the database of mailpiece types further includes mailpiece type entries for a plurality of users, and each mailpiece type entry for a specific user includes a predetermined level of inventory of each mailpiece type for the specific user.

6. The system of claim 1 wherein the notification system further comprises a link to at least one mailpiece supplier, and can notify the at least one mailpiece supplier of a need for more inventory of the particular type of mailpiece.

7. A method of maintaining mailpiece inventory in a franking system comprising:
   storing a plurality of mailpiece types in a database;
   scanning a plurality of mailpieces to be franked to determine a type of each mailpiece from among the plurality of mailpiece types;
   when each mailpiece is franked, incrementing one of a plurality of counters in the franking machine, each counter in the franking machine being associated with one of the plurality of mailpiece types, to reflect the franking of the determined type of mailpiece;
   when each mailpiece is franked, comparing a number of the determined type of mailpiece stored in the counter for the type of mailpiece franked with a predetermined inventory level for the type of mailpiece to determine if more inventory of the type of mailpiece is needed; and
   notifying a user when a level of a first type of mailpiece inventory is below the predetermined inventory level, based upon the comparison.

8. The method of claim 7 further comprising automatically notifying a supplier of the type of mailpiece to provide a new supply of the type of mailpiece if the number of the type of mailpiece franked exceeds the predetermined inventory level.

9. The method of claim 7 further comprising determining the type of mailpiece to be franked by scanning a barcode on the type of mailpiece just prior to franking.

10. The method of claim 7 further comprising determining the type of mailpiece to be franked by optical recognition of at least one dimension of the type of mailpiece just prior to franking of the type of mailpiece.

11. The method of claim 7 further comprising:
   determining that a number of a type of mailpieces franked exceeds a predetermined inventory level;
   generating an email notification to a user of the franking system that an inventory level for the type of mailpiece is below the predetermined inventory level;
   generating an email notification to a supplier of the type of mailpiece to deliver a new inventory of the type of mailpiece to the user; and
   delivering the new inventory of the type of mailpiece to the user.

12. The method of claim 11 further comprising, subsequent to a restocking of inventory of the type of mailpiece, receiving a new inventory level of the type of mailpiece and using the new inventory level to reset the counter.

13. An apparatus comprising:
   a franking machine;

a medium identifier in communication with a database of medium types and coupled to the franking machine, the medium identifier adapted to receive an item to be franked by the franking machine, and to identify the medium type of the item to be franked from among a plurality of medium types defined by the database of medium types, based on information regarding the item to be franked;

a plurality of counters coupled to the medium identifier, each of the plurality of counters associated with a different medium type than each of the other of the plurality of counters, and storing a value that indicates the number of items of the corresponding medium type franked by the franking machine and identified by the medium identifier; and a user interface coupled to the counter, the user interface adapted to provide a notification to a user of the apparatus when the value of the counter reaches a predetermined level corresponding to an inventory level of the medium type.

14. The apparatus of claim 13, wherein the information regarding the item to be franked is a physical dimension of the item to be franked as measured by the medium identifier.

15. The apparatus of claim 13, wherein the information regarding the item to be franked is obtained from an indicia printed on the item.

16. The apparatus of claim 13, wherein the information regarding the item to be franked is the medium type of the item as provided by the user.

* * * * *